(12) United States Patent
Mullaney et al.

(10) Patent No.: US 8,032,001 B2
(45) Date of Patent: Oct. 4, 2011

(54) CABLE STRAIN RELIEF CLAMPING DEVICES AND METHODS FOR USING THE SAME

(75) Inventors: Julian Mullaney, Raleigh, NC (US); Justin Everette Thompson, Angier, NC (US); William Alan Carrico, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 34 days.

(21) Appl. No.: 12/535,946

(22) Filed: Aug. 5, 2009

(65) Prior Publication Data

US 2010/0054688 A1 Mar. 4, 2010

Related U.S. Application Data

(60) Provisional application No. 61/093,856, filed on Sep. 3, 2008, provisional application No. 61/122,003, filed on Dec. 12, 2008.

(51) Int. Cl.
*G02B 6/00* (2006.01)
(52) U.S. Cl. ........................................ 385/135; 385/136
(58) Field of Classification Search .................. 385/135, 385/136
See application file for complete search history.

(56) References Cited

U.S. PATENT DOCUMENTS

| | | | |
|---|---|---|---|
| 3,915,540 A * | 10/1975 | Thompson et al. | 439/432 |
| 4,986,761 A | 1/1991 | Gladden, Jr. et al. | |
| 5,590,234 A | 12/1996 | Pulido | |
| 5,684,911 A | 11/1997 | Burgett | |
| 7,270,485 B1 | 9/2007 | Robinson et al. | |
| 2006/0246771 A1 | 11/2006 | Pepe et al. | |

FOREIGN PATENT DOCUMENTS

| | | |
|---|---|---|
| FR | 2 273 386 A | 12/1975 |
| JP | 60067911 | 4/1985 |
| JP | 03167507 | 7/1991 |
| WO | WO 2004/081614 A2 | 9/2004 |
| WO | WO 2005/001533 | 1/2005 |
| WO | WO 2009/029258 A1 | 3/2009 |

OTHER PUBLICATIONS

International Search Report and Written Opinion of the International Searching Authority issued by the European Patent Office on Feb. 4, 2010 for corresponding PCT application No. PCT/US2009/004929.
Notification of Transmittal of the International Preliminary Report on Patentability and International Preliminary Report on Patentability corresponding to International Application No. PCT/US2009/004929; Date of mailing: Nov. 5, 2010; 17 pages.
International Search Report and Written Opinion of the International Searching Authority issued by the European Patent Office on Apr. 1, 2010 for corresponding PCT application No. PCT/US2009/066950.

* cited by examiner

*Primary Examiner* — Ryan Lepisto
*Assistant Examiner* — Jerry Blevins
(74) *Attorney, Agent, or Firm* — Myers Bigel Sibley & Sajovec (57) ABSTRACT

A closure device for receiving a fiber optic cable includes an enclosure defining a splice chamber configured to accommodate splices to the plurality of optical fibers. The enclosure has a clamp receiving section therein. The closure device further includes a clamping device configured to concurrently secure the remaining portion of the jacket and the strength member at a same clamp interface of the clamping device. The clamping device is configured to be removably inserted into the clamp receiving section of the enclosure. The clamp receiving section is configured to fixedly limit movement of the clamping device relative to the enclosure when the clamping device is installed therein to secure the remaining portion of the jacket and the strength member secured in the clamping device to the enclosure.

11 Claims, 9 Drawing Sheets

CABLE STRAIN RELIEF CLAMPING DEVICES AND METHODS FOR USING THE SAME

RELATED APPLICATION(S)

The present application claims the benefit of U.S. Provisional Patent Application No. 61/093,856, filed Sep. 3, 2008, and U.S. Provisional Patent Application No. 61/122,003, filed Dec. 12, 2008, the disclosures of which are hereby incorporated herein by reference in their entireties.

BACKGROUND OF THE INVENTION

The present invention relates to communication cable systems and, more particularly, to optical fiber clamping systems and methods for clamping optical fibers with the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

In addition to the optical fibers, a typical fiber optic cable may include cable jacketing material, cable strength members and fiber containment tubes. These three basic elements sometimes have different properties, such as different hardnesses, different stiffnesses, and different coefficients of thermal expansion. It may be desirable in many situations to limit or even prevent the cable jacketing and the cable strength members from axial displacement relative to one another, and/or relative to a cable enclosure or other device attached to the cable. A typical situation in which the securing is desired is where an opening has been made in the fiber optic cable for accessing the internal optical fibers, and where a splice enclosure may be installed.

In some existing systems, the securing of the securing of an accessed portion of a fiber optic cable may be achieved by first removing the cable outer jacket in order to expose some length of the strength members of the cable. The securing of the outer cable jacket is typically achieved by mechanically securing the outer cable jacket to a substrate at a location where the cable jacket is intact, i.e., outside of the region of the cable jacket that has been removed. This generally allows a circumferential clamp, such as a hose clamp or the like, to be tightened around the intact outer cable jacket, and then the clamp is attached to a substrate. In some cases, the clamp may be tightened around the full cable jacket and an extending element of the substrate so as to secure the cable outer jacket to the substrate. The cable strength element(s) are typically clamped in another clamp device, which is also attached to the substrate. This clamping may be achieved by various arrangements of screw actuated clamps and the like in order to bind down on and exert high forces upon the generally more rigid and harder strength member material. Thus, in combination, the clamping of the intact outer cable sheath to the substrate, and the clamping of the protruding exposed strength member(s) to the substrate can limit or even prevent displacement between the two, and can also serve as a means to jointly anchor the two to a device, such as a splice closure.

Generally, one reason for using two clamping mechanisms for the outer cable sheath and the strength members is that the cable jacket is relatively soft and, thus, usually requires a circumferential clamp that spreads the load over a surface area so as to avoid excessive point loading on the soft cable jacket material. The strength members are usually very hard materials, such as fiber glass or steel, and generally require much higher point loading to secure them sufficiently.

SUMMARY OF THE INVENTION

According to some embodiments of the present invention, a clamping device is provided for a fiber optic cable. The cable has a lengthwise cable axis and includes a plurality of optical fibers, a strength member and a jacket surrounding the optical fibers having a section thereof partially removed in a scalloped configuration that exposes an underlying section of the strength member while leaving a remaining portion of the jacket extending under the strength member. The clamping device includes a first and a second clamp member. The first clamp member has a receiving channel therein configured to receive the remaining portion of the jacket. The second clamp member has a first face configured to be received in the receiving channel of the first clamp member with the remaining portion of the jacket and the strength member positioned between the first clamp member and the second clamp member and a second face, opposite the first face, including a region configured to receive the plurality of optical fibers. A coupling member couples the first clamp member and second clamp member. The coupling member is configured to provide sufficient force between the first clamp member and the first face of the second clamp member to limit lengthwise movement of the strength member and remaining portion of the jacket therebetween.

In other embodiments, the coupling member extends at least partially through the first clamp member and the second clamp member. The region of the second clamp member configured to receive the plurality of optical fibers is a receiving channel. At least one of the receiving channel of the first clamp member and the first face of the second clamp member may include ridges configured to deform the strength member when the strength member is secured therebetween to increase a force required to produce lengthwise movement of the strength member. The receiving channel of the first clamp member and the first face of the second clamp member may include at least one ridge in alternating lengthwise locations configured to deform the strength member into a serpentine shape.

In further embodiments, a closure device is provided including the clamping device as described above fixedly secured in an enclosure with the remaining portion of the jacket and the strength member secured in the clamping device to limit movement of the cable relative to the enclosure.

In other embodiments, the first clamp member and the second clamp member are a first clamping device and the clamping device further includes a second clamping device configured to be coupled to the first clamping device. The first clamping device and the second clamping device form a clamping device assembly. The second clamping device has a first clamp member and a second clamp member configured to receive a second remaining portion of a jacket of a fiber optic cable and a second strength member therebetween. The coupling member is configured to couple the first clamp member and second clamp member of the second clamping device to provide sufficient force between the first clamp member and the second clamp member of the second clamping device to limit lengthwise movement of the second strength member and second remaining portion of the jacket therebetween. The coupling member is further configured to couple the first clamping device to the second clamping device to define the clamping device assembly. The coupling member may extend at least partially through the first clamp member and the second clamp member of the first clamping device and at least partially through the first clamp member and the second clamp member of the second clamping device. The region of the second clamp member configured to receive the plurality of optical fibers may be a curved face of the first clamp member of the first clamping device.

In further embodiments, the first clamp member and the second clamp member of the first clamping device are configured to deform the strength member into a serpentine shape when the strength member is secured therebetween to increase a force required to produce lengthwise movement of the strength member therebetween. The first clamp member and the second clamp member of the second clamping device are configured to deform the second strength member into a serpentine shape when the strength member is secured therebetween to increase a force required to produce lengthwise movement of the strength member therebetween.

In yet other embodiments, a first mating feature is provided on the first clamping device and a corresponding second mating feature is provided on the second clamping device. The first and second mating features are configured to limit relative lengthwise movement between the first and second clamping devices in at least one lengthwise direction. The first mating feature may be a first transverse face on the first clamping device and the second mating feature may be a second transverse face on the second clamping device. The first transverse face may abut the second transverse face when the first clamping device is coupled to the second clamping device to rigidly limit relative lengthwise movement between the clamping devices in at least one direction.

In further embodiments, the first clamping device is configured to slidably couple to the second clamping device. The first mating feature further includes a key member on the first clamping device. The second mating feature further includes a receiving channel on the second clamping device that is configured to slidably receive the key member. The key member may be advanced in the receiving channel in the one direction until the first transverse face abuts the second transverse face and the key member may be advanced in an opposite lengthwise direction to remove the key member from the receiving channel.

In yet other embodiments, a closure device for receiving a fiber optic cable is provided. The closure device includes an enclosure defining a splice chamber configured to accommodate splices to the plurality of optical fibers. The enclosure has a clamp receiving section therein. The closure device further includes a clamping device configured to concurrently secure the remaining portion of the jacket and the strength member at a same clamp interface of the clamping device. The clamping device is configured to be removably inserted into the clamp receiving section of the enclosure. The clamp receiving section is configured to fixedly limit movement of the clamping device relative to the enclosure when the clamping device is installed therein to secure the remaining portion of the jacket and the strength member secured in the clamping device to the enclosure.

In further embodiments, the clamping device includes a longitudinally extending channel and the clamp receiving section includes a mating retaining tab configured to be received in the longitudinally extending channel to limit transverse movement of the clamping device when the clamping device is inserted in the clamp receiving section. The mating retaining tab may include a longitudinally extending finger defining an underling receiving slot that is configured to have a rear end of the clamping device inserted therein and a rear stop face that is configured to abut the rear end of the clamping device when the clamping device is inserted therein to limit lengthwise movement of the inserted clamping device away from the splice chamber.

In other embodiments, the clamp receiving section further includes a forward stop face and the enclosure includes a base member including the mating retaining tab and a splice member. The splice member is configured to be coupled to the base member and includes the forward stop face. The forward stop face is configured to abut a forward end of the clamping device when the clamping device is inserted in the clamp receiving section and the splice member is coupled to the base member.

In yet further embodiments, methods for securing a fiber optic cable to a closure device include concurrently securing the remaining portion of the jacket and the strength member at a same clamp interface of a clamping device. The same clamp interface is positioned at a location proximate an end of the removed section selected to limit a length of the strength member exposed between the same clamp surface and the end of the removed section. The clamping device is configured to be removably inserted into a clamp receiving section of the closure device. The clamping device with the remaining portion of the jacket and the strength member secured therein is inserted into the clamp receiving section of the closure device to secure the remaining portion of the jacket and the strength member secured in the clamping device to the closure device and fixedly limit their movement relative to the closure device. The exposed plurality of optical fibers is positioned in a splice chamber of the closure device and the splice chamber is covered with the plurality of optical fibers therein.

In other embodiments, the clamping device is a first clamping device and concurrently securing is preceded by partially removing the section of the jacket from the first end to a second, opposite lengthwise end to define a length of the section. Inserting the clamping device is preceded by concurrently securing the remaining portion of the jacket and the strength member at a second same clamp interface of a second clamping device and with the second same clamp interface positioned at a location proximate the opposite lengthwise end of the removed section selected to limit a length of the strength member exposed between the second same clamp surface and the opposite lengthwise end of the removed section. The second clamping device is coupled to the first clamping device to define a clamping device assembly. The clamping device assembly is configured to be removably inserted into a clamp receiving section of the closure device. The clamping device assembly with the remaining portion of the jacket and the strength member secured in the respective clamping devices is inserted into the clamp receiving section of the closure device to secure the remaining portion of the jacket and the strength member secured in the respective clamping devices to the closure device and fixedly limit their movement relative to the closure device.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

The description below references enclosing a portion of a fiber optic cable to a closure device and securing the closure device with respect to the cable portion. The referenced fiber optic cables may include multiple optical fiber ribbons, a buffer tube, strength members, a jacket and a metal shield layer; however, according to other embodiments, fiber optic cables of other constructions (e.g., a fiber optic cable not having a metal shield layer) may be used with embodiments of the present invention.

As will be described further herein, some embodiments of the present invention provide devices configured to secure the individual elements of a fiber optic cable to each other, and to limit or even prevent them from moving relative to one another. In some embodiments of the present invention, a clamping device is provided that is configured to compress together a portion of the outer cable sheath jacket and the cable strength members at the same time. First a cable is provided that generally looks like the configuration shown in FIGS. 1A and 1B. A section of the cable outer jacket and the central containment of buffer tube are removed in a "scallop" configuration to allow access to the fiber(s) inside, but such that a substantial portion of the cable jacket and buffer tube remains intact along with the strength member(s) (i.e., is not fully severed between the longitudinal ends of the scalloped opening). The cross-sectional view of FIG. 1B shows the approximate shape of the remaining portion of the cable elements after the access opening is made.

After the cable is provided, the remaining cable elements (e.g., outer cable jacket, strength members and central containment/buffer tube) are clamped together. The clamping of the cable elements to each other, with the optical fibers passing above the upper clamp member and the outer jacket and strength member between the upper and lower clamp members, and subsequently to a cable splice enclosure in this region, can be accomplished by many different embodiments of the clamping device as will be further described below.

Figure 1A:
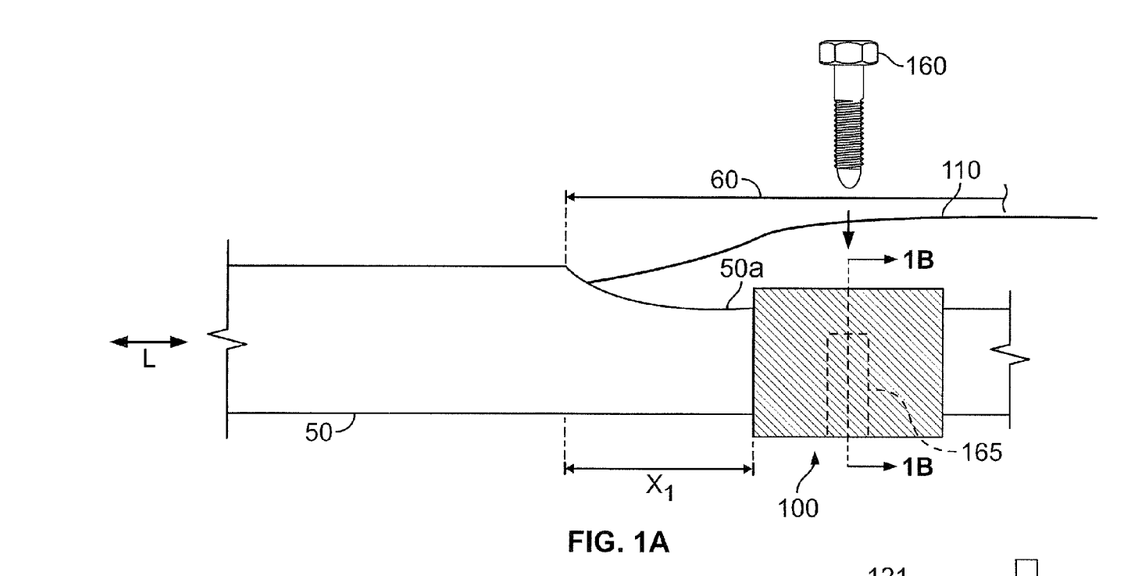
FIG. 1A is a side view of a clamping device for a fiber optic cable according to some embodiments of the present invention.
Figure 1B:
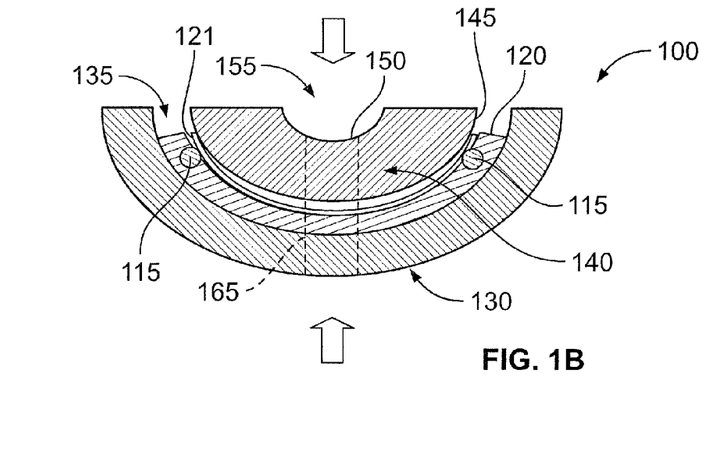
FIG. 1B is a cross-sectional view taken along line 1B-1B of FIG. 1A.

Some embodiments of a clamping device 100 for a fiber optic cable 50 will now be further described with reference to the side view of FIG. 1A and the cross-sectional view taken along line 1B-1B of FIG. 1 as shown in FIG. 1B. As seen in FIGS. 1A and 1B, the cable 50 has a lengthwise (longitudinal) cable axis L and includes a plurality of optical fibers 110, a pair of strength members 115 and a jacket 120 surrounding the optical fibers 110. While illustrated in FIG. 1B as not being at diametrically opposed locations in FIG. 1B, it will be understood that the strength members 115 in a cable type having a pair of strength members 115 are generally positioned in diametrically opposed locations on opposite sides of the cable 50 although such orientation may be altered when clamped as will be described below. The jacket material 120 has a section 60 thereof partially removed in a scalloped configuration that exposes an underlying section of the strength members 115 and the optical fibers 110 while leaving a remaining portion 50a of the jacket 120 extending under the strength members 115 and the optical fibers 110. Also shown in FIG. 1B is a remaining portion of a central buffer tube 121 of the cable 50.

For purposes of this discussion, the terms longitudinal and lengthwise are used interchangeably to refer to a direction along the cable axis L while the term transverse is used to refer to a plane as seen in the cross-sectional view of FIG. 1B, which transverse direction is defined by a plane relative to the cable axis L that may extend up and down or into and out of the view as shown in FIG. 1A. Finally, references to "forward" as used herein refers to the right side as seen in FIG. 1A, where a closure will generally be located, while "rear" refers to the left side as shown in FIG. 1A. It will also be understood that the cable 50, in practice, will generally be cut to form the section 60 so as to provide an access opening to the cables 110. More particularly, this section 60 will generally be provided at a location where access to the fibers 110 for splicing or the like is desired. According to some embodiments, the access opening is formed using an apparatus and/or method as disclosed in co-assigned U.S. patent application Ser. No. 12/194,178, filed Aug. 19, 2008, the disclosure of which is incorporated herein by reference. One or more splices may be formed between the cable(s) 110 and cables from a drop cable or the like.

As shown in the embodiments of FIGS. 1A and 1B, the clamping device 100 includes a first clamp member 130 and a second clamp member 140. Also seen in the embodiments of FIGS. 1A and 1B is a coupling member 160, shown as a screw in the illustrated embodiments. The first clamp member 130 has a receiving channel 135 therein that is configured to receive the remaining portion of the jacket 50a in the strength members 115. The second clamp member 140 has a first face 145 configured to be received in the receiving channel 135 of the first clamp member 130 with the remaining portion 50a of the jacket and the strength members 115 positioned between the first clamp member 130 and the second clamp member 140. A second face 150 of the second clamp member 130, opposite the first face 145, includes a region 155 configured to receive the plurality of optical fibers 110. As seen in FIG. 1B, the region 155 in the illustrated embodiments is a receiving channel 155 that receives the optical fibers 110.

The coupling member 160 in the illustrated embodiments couples the first clamp member 130 and the second clamp member 140. More particularly, the coupling member 160 is configured to provide sufficient force between the first clamp member 130 and the first face 145 of the second clamp member 140 to limit lengthwise (along the cable axis L) movement of the strength members 115 and the remaining portion 50a of the jacket 120 therebetween.

Thus, as described above, the clamping device 100 illustrated in FIGS. 1A and 1B is configured to concurrently secure the remaining portion 50a of the jacket 120 and the strength members 115 at a same interface of the clamping device 100. This differs, for example, from the conventional approach described above, where the cable strength elements 115 are clamped in a separate clamp device, or at a different clamp interface, from the generally softer material of the jacket 120. As was noted above, such an approach may be facilitated by embodiments of the present invention in that a significantly greater amount of force may be effectively applied to the jacket 120 on the remaining portion 50a as contrasted with the uncut portions of the jacket that are less readily secured by the compressive load.

Further note that, in the embodiments of FIGS. 1A and 1B, the coupling member 160 extends at least partially through the first end clamp member 130 and the second clamp member 140 as seen by the threaded passage 165 schematically shown in FIGS. 1A and 1B.

Figure 2:
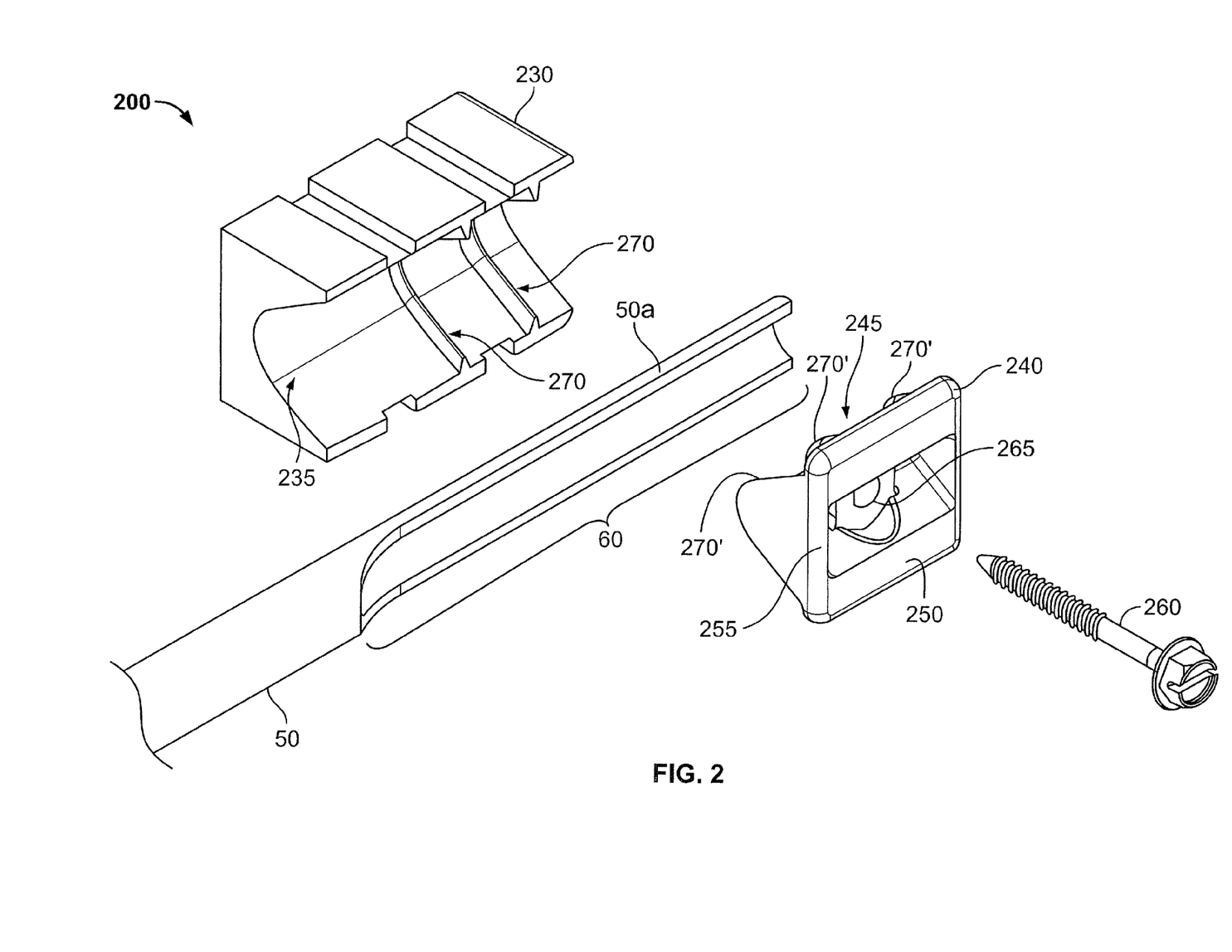
FIG. 2 is an exploded, perspective view of a clamping device for a fiber optic cable according to further embodiments of the present invention.
Figure 3:
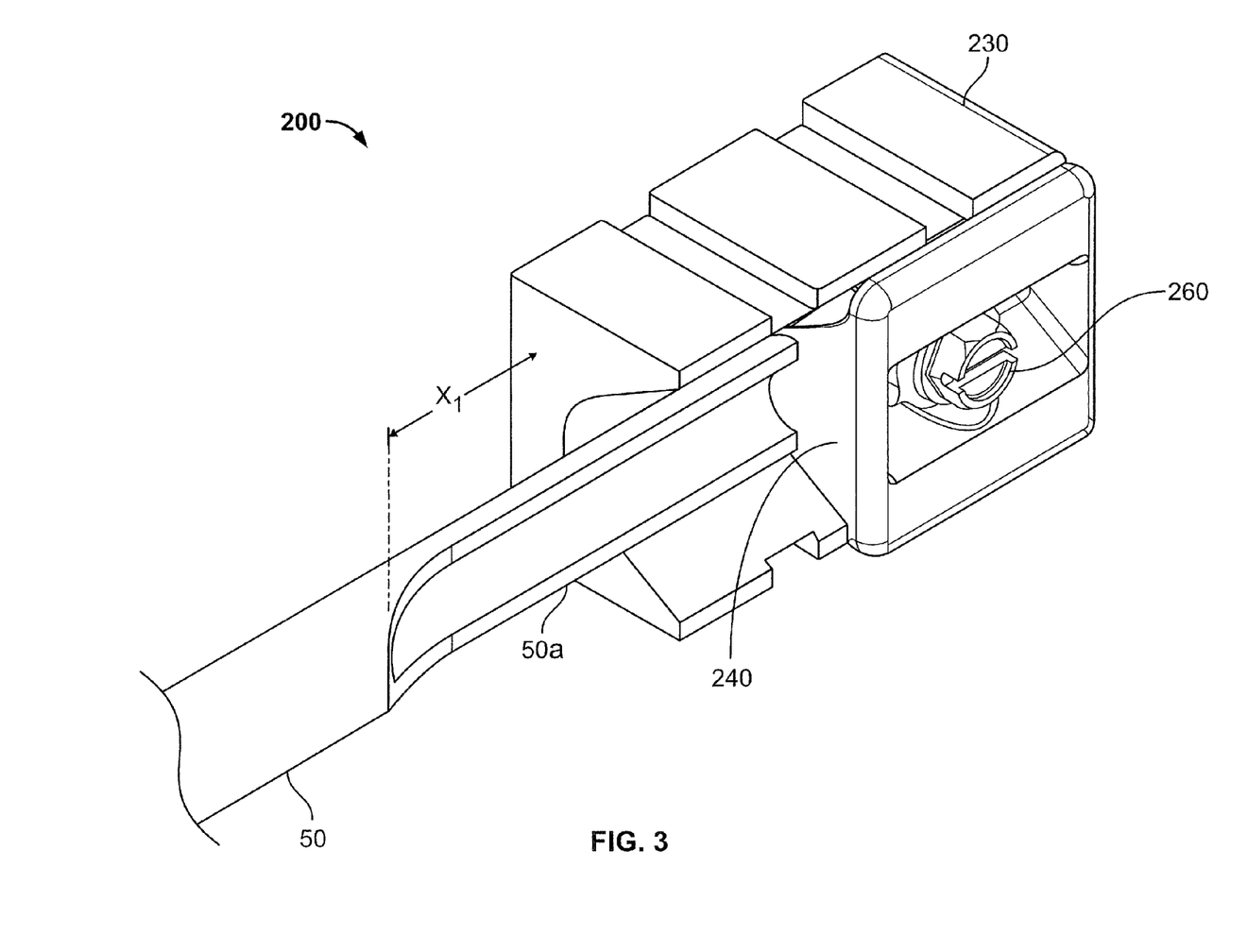
FIG. 3 is a perspective view of the clamping device of FIG. 2.

Further embodiments will now be described with reference to FIGS. 2 and 3. FIG. 2 is an exploded perspective view of a clamping device 200 for a fiber optic cable 50. FIG. 3 is a perspective view of the clamping device 200 of FIG. 2. For purposes of illustration, the fibers 110 and any other internal components of the cable 50 are not shown in FIGS. 2-7. As seen in the embodiments of FIGS. 2 and 3, the clamping device 200 includes a first clamp member 230 and a second clamp member 240. A coupling member 260, shown as a screw, couples the clamp members 230, 240 to provide sufficient force between the first clamp member 230 and the second clamp member 240 to limit lengthwise (along the cable longitudinal axis L) movement of the remaining portion of the jacket 50a and the strength members 115 clamped therebetween. Similarly numbered features (e.g., 130, 230) in the embodiments of FIGS. 2 and 3 generally correspond to the likewise numbered features described previously with reference to FIGS. 1A and 1B.

The embodiments illustrated in FIGS. 2 and 3 differ in part in that a receiving channel 235 of the first clamp member 230 and a first face 245 of the second clamp member 240 are both shown as including ridges 270, 270' configured to deform the strength members 115 when the strength members 115 are secured therebetween to increase a force required to produce lengthwise movement of the strength members 115. More particularly, the respective ridges 270 and ridges 270' are arranged in alternating lengthwise locations along the cable axis L so as to deform the strength members 115 into a serpentine shape. However, it will be understood that, in some embodiments, ridges 270, 270' may be provided on only one of the clamp members 230, 240. The embodiments of FIGS. 2 and 3 further differ from those described with reference to FIGS. 1A and 1B in that a region 255 of the second clamp member 240 configured to receive the optical fibers 110 is a curved face 255 of the second clamp member 240

Figure 4:
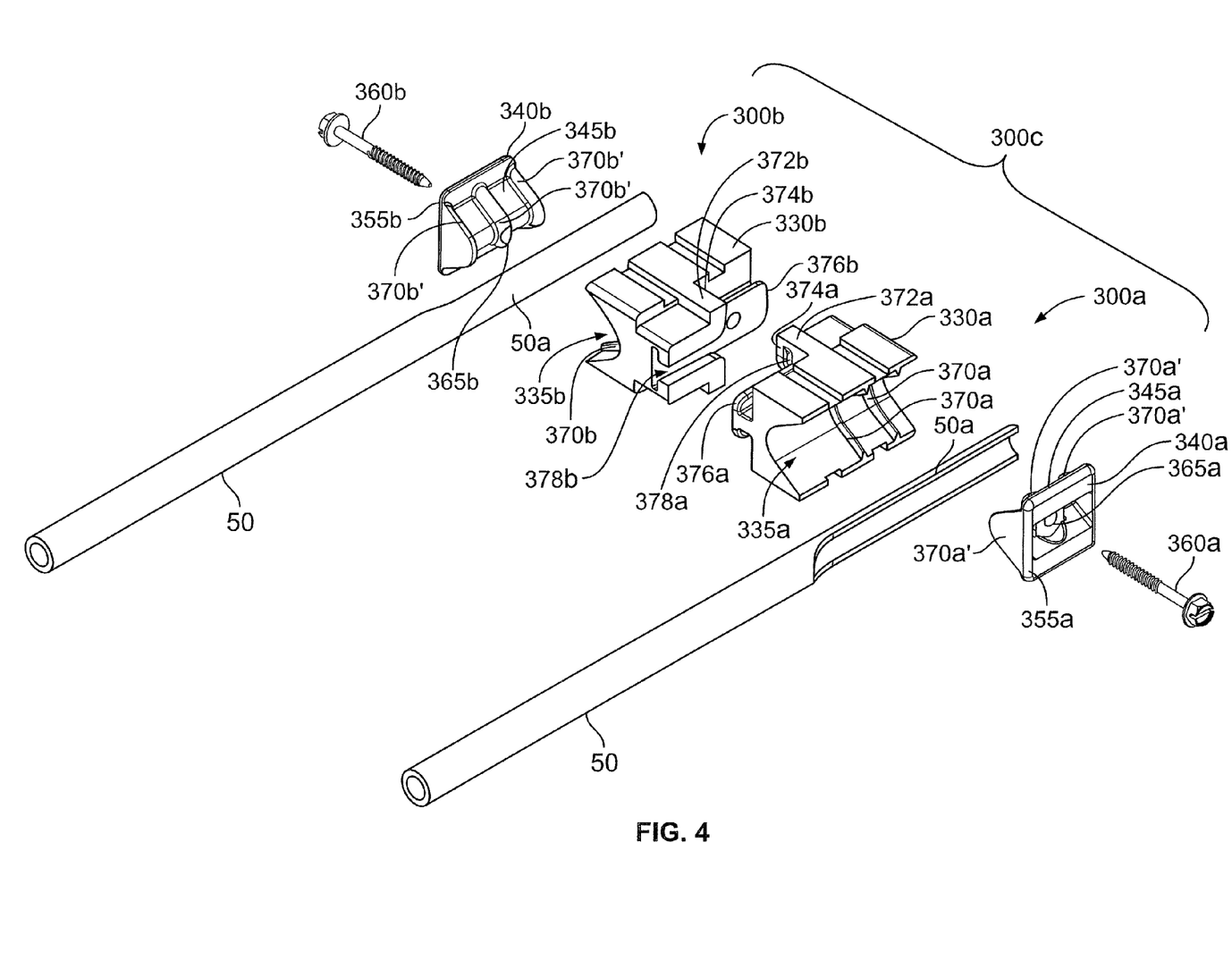
FIG. 4 is an exploded, perspective view of a clamping device assembly for a fiber optic cable according to other embodiments of the present invention.
Figure 5:
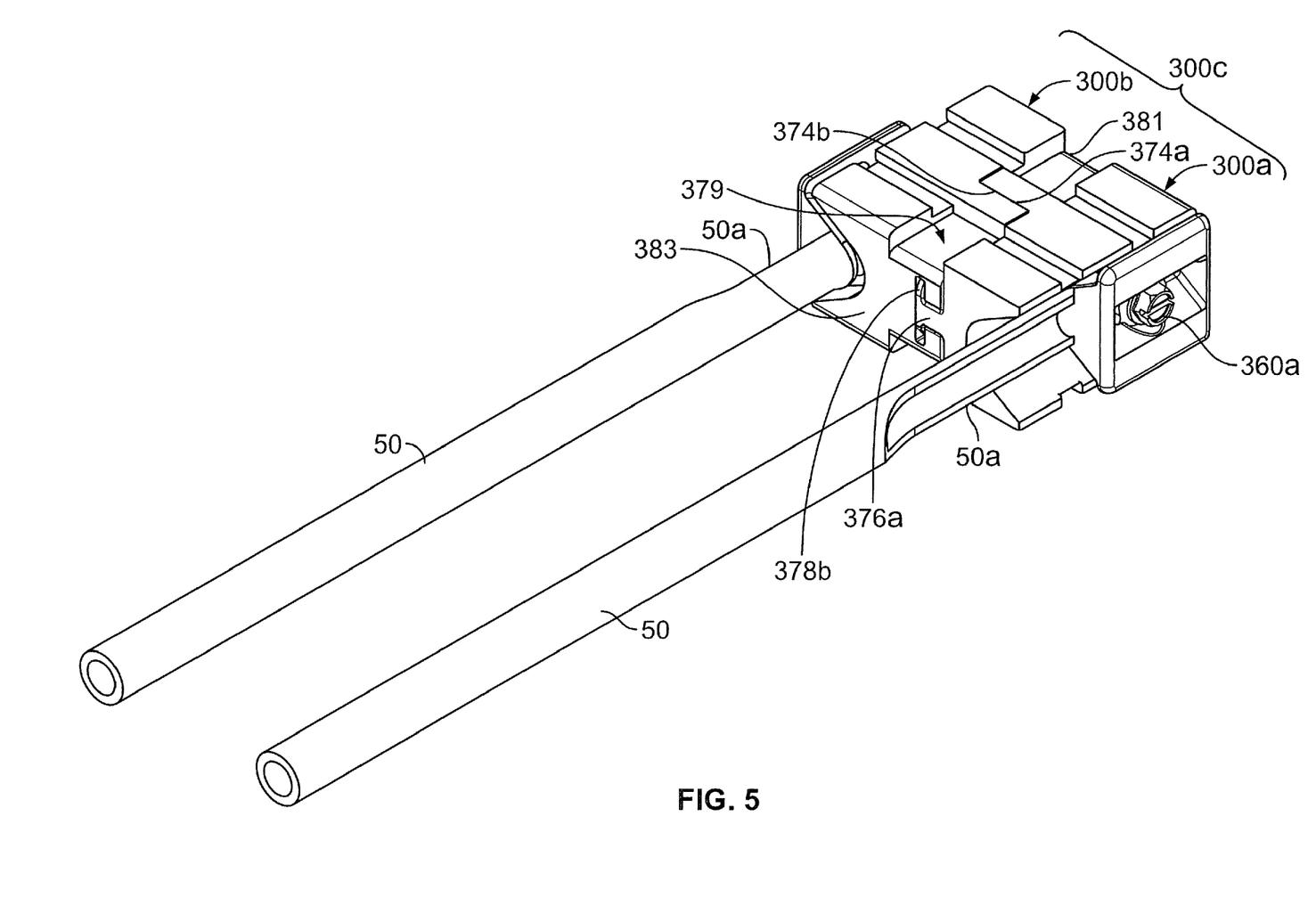
FIG. 5 is a perspective view of the clamping device assembly of FIG. 4.

Further embodiments of the present invention will now be described with reference to FIGS. 4 and 5. FIG. 4 is an exploded perspective view of a clamping device assembly 300c for a fiber optic cable 50. FIG. 5 is a perspective view of the clamping device assembly 300c of FIG. 4. As seen in the embodiments of FIGS. 4 and 5, the clamping device assembly 300c includes a first clamping device 300a and a second clamping device 300b. Note that like numbered features of the embodiments of FIGS. 4 and 5 (e.g., 140, 240, 340a, 340b) generally correspond to the discussion above with reference to FIGS. 1A through 3. Furthermore, the respective clamping devices 300a, 300b are generally substantially identical in the illustrated embodiments of FIGS. 4 and 5, with the respective features thereof differentiated by the addition of an "a" or "b" to the respective reference numbers for purposes of this description. However, it will be understood that embodiments of clamping device assemblies of the present invention are not limited to combinations in which the respective clamping devices 300a, 300b are substantially identical.

As shown in the embodiments of FIGS. 4 and 5, the respective clamping devices 300a, 300b each receive an associated remaining portion 50a of the jacket 120 of the fiber optic cable 50. While shown as separate cables 50 in FIGS. 4 and 5, it will be understood that these illustrated cables 50 may be two sections (e.g., upstream and downstream) of a single fiber optic cable 50. Furthermore, the scalloped sections 60 may be formed using a single cutting operation extending from the scalloped lead-in edge of one of the cable 50 sections through the scalloped ending edge of the other or may be formed by removing two distinct sections 60 at different locations on the cable 50. Furthermore, while shown as cut off and terminated on the edge to the right as seen in FIG. 4, the remaining portion 50a may continue in a U-shaped path continuously from one to the other section of the cable 50 in some embodiments. In other words, the remaining portion 50a may extend through a splice chamber in which the clamping device assembly 300c is installed along with the fibers 110 passing through the splice chamber (note that the fibers 110 are not shown in FIGS. 4 and 5 for purposes of clearer understanding of the embodiments shown therein). However, in other embodiments, a segment of the remaining portion 50a, the central buffer tube 121 and other components of the cable 50 may be removed in other embodiments, leaving end segment(s) of the remaining portion 50a sufficient to attach clamping devices 300a, 300b thereto.

The embodiments of FIGS. 4 and 5 differ, in part, in that the coupling members 360a, 360b couple both pairs of the respective clamp members 340a, 330a and 340b, 330b and also couple the respective clamping devices 300a, 300b. Furthermore, while two coupling members (screws 360a, 360b) are shown in the illustrated embodiments of FIGS. 4 and 5, a single coupling member may be used to securely couple the respective clamping devices 300a, 300b and, in some embodiments, to couple the respective components 330a, 340a and 330b, 340b. The embodiments shown in FIGS. 4 and 5 further differ in the inclusion of corresponding mating features on the respective clamping devices 300a, 300b that are configured to limit relative lengthwise movement between the clamping devices 300a, 300b in at least one lengthwise direction. More particularly, such movement limitation may be provided before the coupling members 360a, 360b are operative to couple the respective clamping devices 300a, 300b, such as during the assembly of the clamping device assembly 300c to provide a secure connection to a closure device as will be further described herein.

The first feature in the illustrated embodiments includes a first transverse face 374a formed on a column member 372a of the first clamping device 300a. Similarly, the second mating feature is shown as a second transverse face 374b formed on a column 372b of the second clamping device 300b. The first transverse face 374a abuts the second transverse face 374b when the first clamping device 300a is coupled to the second clamping device 300b to rigidly limit relative lengthwise movement therebetween in at least one direction as seen in FIG. 5. It will be understood that, as the coupling members 360a, 360b are fully installed in FIG. 5, they may operate to limit lengthwise movement between the coupling devices 300a, 300b in both lengthwise directions.

As also shown in the embodiments of FIGS. 4 and 5, the first clamping device 300a is configured to slidably couple to the second clamping device 300b. The first mating feature further comprises a key member 376a on the first clamping device 300a. The second mating feature includes a receiving channel 378b on the second clamping device 300b that is configured to slidably receiving the key member 376a of the first clamping device 300a. Note that, for the particularly illustrated embodiments of FIGS. 4 and 5, a corresponding key member 376b and receiving channel 378a are provided as the respective clamping devices 300a, 300b are substantially identical. The key members 376a, 376b may be advanced in the receiving channels 378a, 378b in one direction (opposite directions when viewed with respect to respective ones of the clamping devices 300a, 300b) until the first transverse face 374a abuts the second transverse face 374b. The key members 376a, 376b may be advanced in an opposite lengthwise direction to remove the key members 376a, 376b from the respective corresponding receiving channels 378a, 378b.

Figure 6:
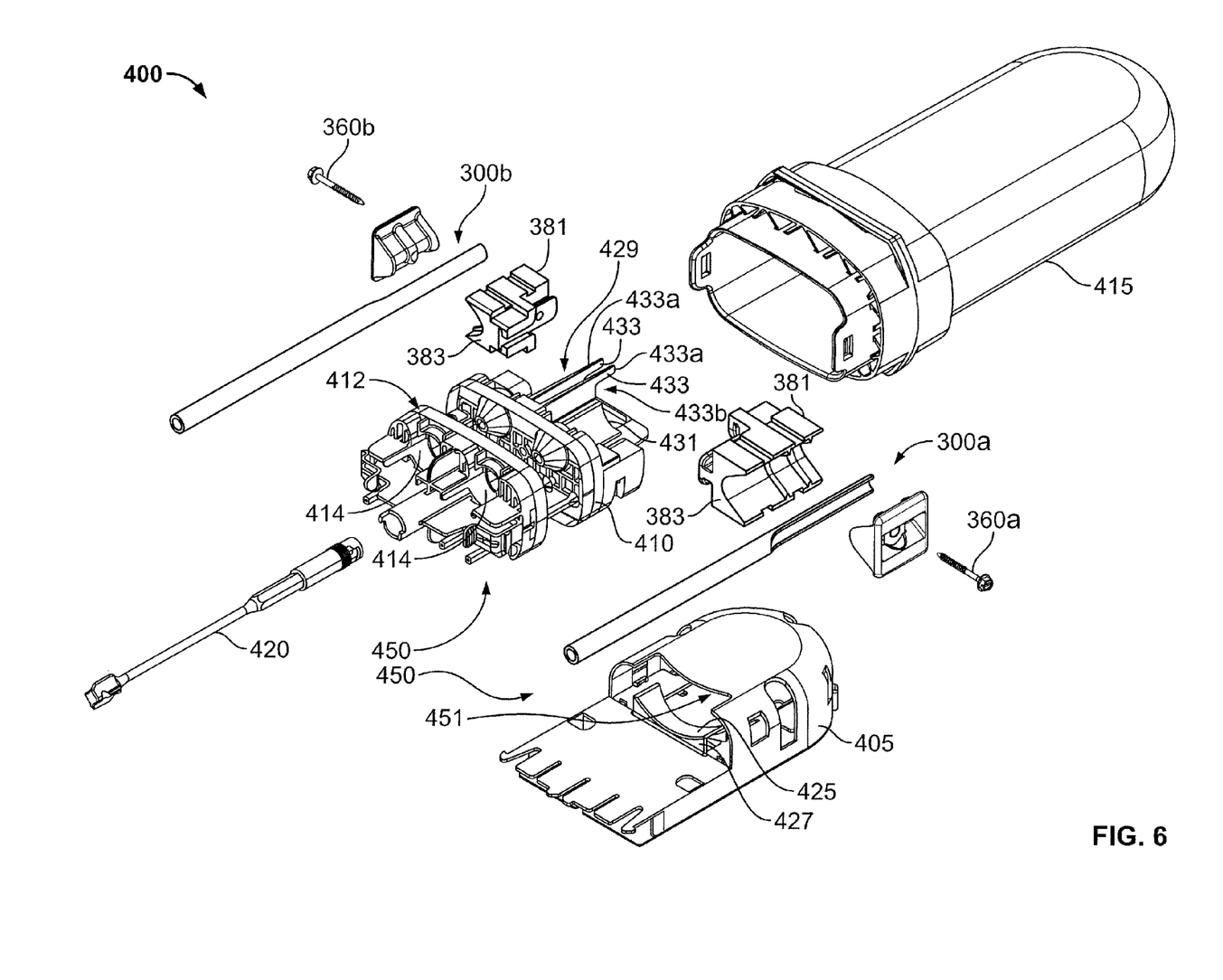
FIG. 6 is an exploded, perspective view of a closure device including the clamping device assembly of FIG. 4 according to some embodiments of the present invention.

While both screws are shown as securing the respective body members of the clamping devices together other types of securing members may be provided, including a single clamp that secures the body members of both clamping devices. In addition, while the clamping devices slide together in the illustrated embodiments using mating features thereon, a separate securing member may be provided. For example, the described clamp for the body members may further couple the clamping devices into the configuration shown in FIG. 6. Furthermore, the slide coupling of the embodiments of FIGS. 5 and 6 may be oriented so that the mating of the faces of the respective clamping devices seen in FIG. 6 is selected to rigidly limit movement of the clamping devices, and the retained cables, when the cables are pulled to the left as seen in FIG. 6 (typically away from the closure device to which the clamping assembly will be secured), the clamping assembly may be configured to limit relative movement of the clamping devices to the left and right. By installing a clamping device on each cable section and joining the two clamping devices to each other, the overall strength characteristics of the original un-opened cable may be restored.

Figure 7:
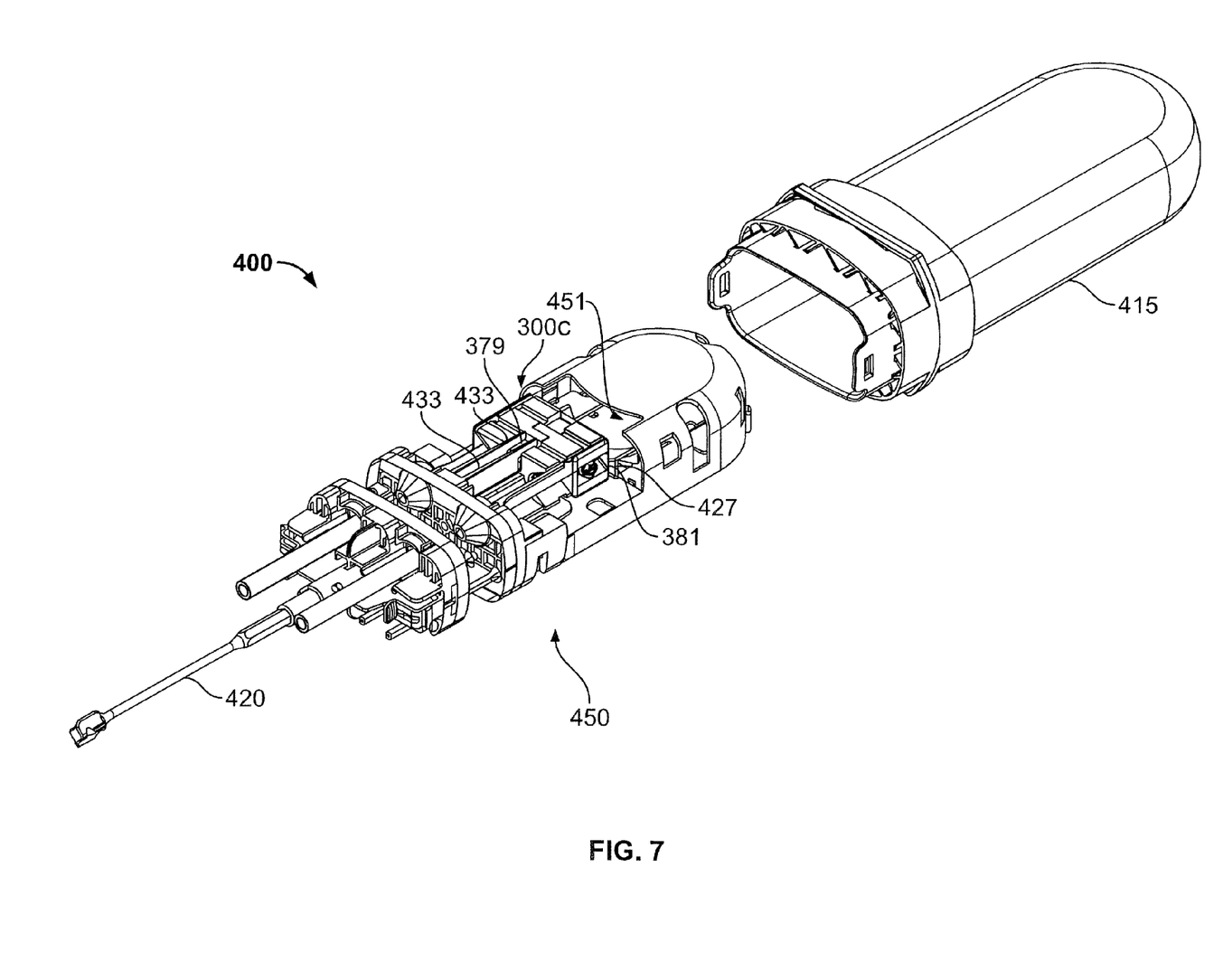
FIG. 7 is a partially exploded, perspective view of the closure device of FIG. 6.
Figure 8:
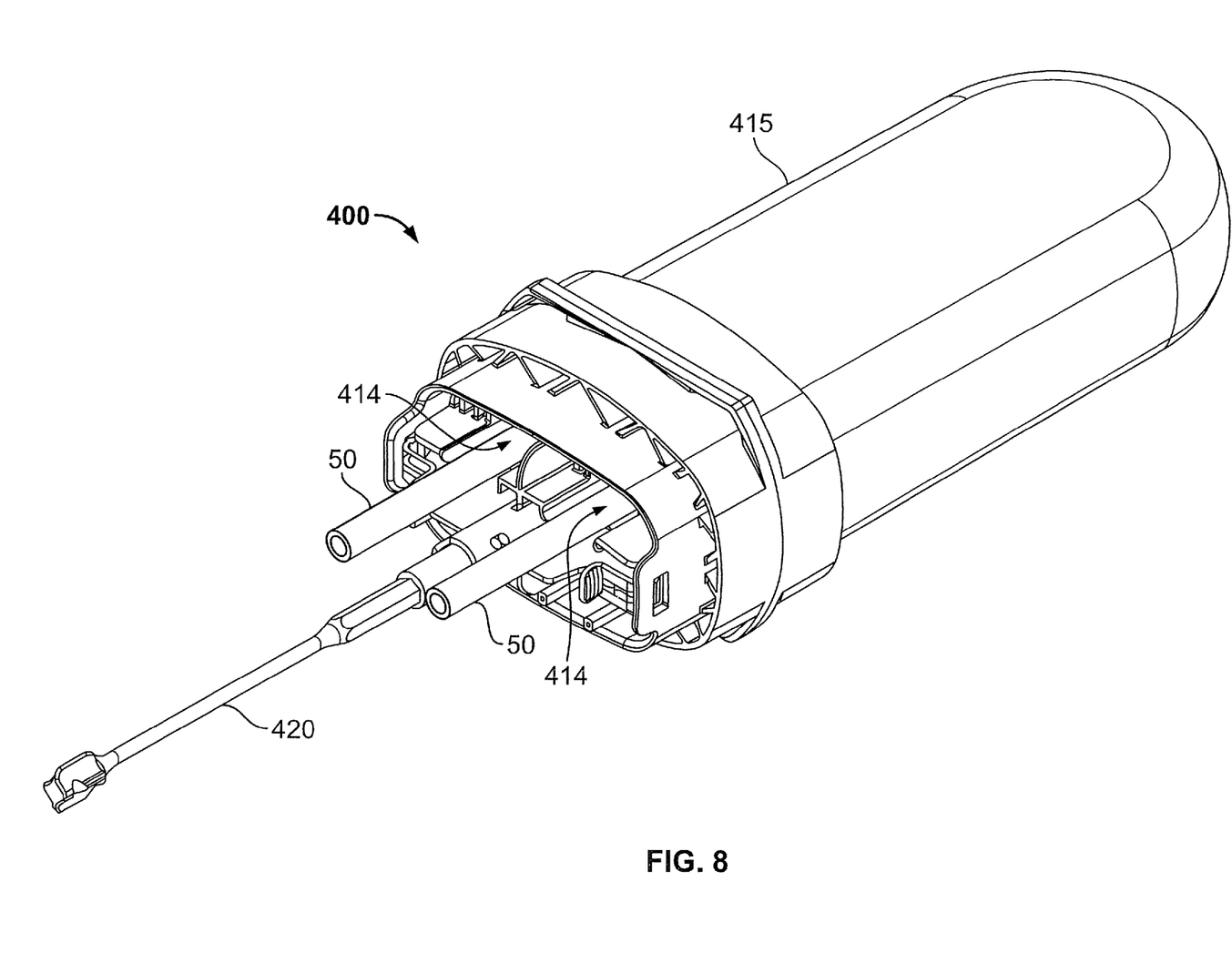
FIG. 8 is a perspective view of the closure device of FIG. 6.

A closure device 400 according to some embodiments of the present invention using the clamping device assembly 300c of FIGS. 4-5 will now be described with reference to FIGS. 6-8. FIG. 6 is an exploded perspective view of the closure device 400 including the clamping device assembly device 300c of FIG. 4 according to some embodiments of the present invention. FIG. 7 is a partially exploded perspective view of the closure device 400 of FIG. 6 and FIG. 8 is a perspective view of the closure device 400 of FIG. 6.

The illustrated closure device 400 includes an enclosure 450 and a cover 415. The closure device 400 is configured to fixedly secure the clamping device assembly 300c therein to limit movement of the cable 50 relative to the enclosure 450.

The enclosure 450 defines a splice chamber 451 configured to accommodate splices to the optical fibers 110. The enclosure 450 has a clamp receiving section 429 therein to secure a clamping device 300a, 300b or clamping device assembly 300c positioned therein. The clamping device assembly 300c is configured to be removably inserted into the clamp receiving section 429 of the enclosure 450 and the clamp receiving section 429, as discussed above, is configured to fixedly limit movement of the clamping device assembly 300c relative to the enclosure 450 when the clamping device assembly 300c is installed therein to secure the remaining portion 50a of the jacket 120 and the strength member 150 secured in the clamping device assembly 300c, to the enclosure 450.

The enclosure 450 includes a base member 410, 412 and a splice member 405 configured to be coupled to the base member 410, 412. More particularly, the illustrated base member includes a first section 410 and a second section 412 that may be longitudinally moved relative to each other by a tool 420 inserted therein when the tool 420 is subjected to rotary movement. It is known that such an approach, in combination with a gel or other sealant material between the respective sections 410, 412, may be used to provide an effective environmental seal to cables passing through openings 414 into the closure device 400 to form splices or like in the splice chamber 451.

Further details of the clamp receiving section 429 will now be described with reference to FIGS. 6 and 7. The clamp receiving section 429 includes a mating retaining tab 433 located on the base member 410, 412. The mating retaining tab 433 is configured to be received in a longitudinally extending channel 379 of the clamping device assembly 300c as best seen in FIG. 7. When the mating retaining tab 433 is received in the channel 379, it may limit the transverse movement of the clamping device assembly 300c when the clamping device 300c is inserted in the clamp receiving section 429.

The mating retaining tab 433 in the illustrated embodiments of FIGS. 6 and 7 includes a longitudinally extending finger(s) 433a defining an underlying receiving slot 433b that is configured to have a rear end 383 of the clamping device assembly 300c inserted therein. The mating retaining tab 433 further includes a rear stop face 431 that is configured to abut the rear end 383 of the clamping device assembly 300c when the clamping device assembly 300c is inserted therein to limit lengthwise movement of the inserted clamping device assembly 300c away from the splice chamber 351.

As also shown in the illustrated embodiments of FIGS. 6 and 7, the splice member 405 includes a forward stop face 427 of the clamp receiving section 429. The forward stop face 427 is configured to abut a forward end 381 of the clamping device assembly 300c when the clamping device 300c is inserted in the clamp receiving section 429 and the splice member 405 is coupled to the base member 410, 412.

Figure 9:
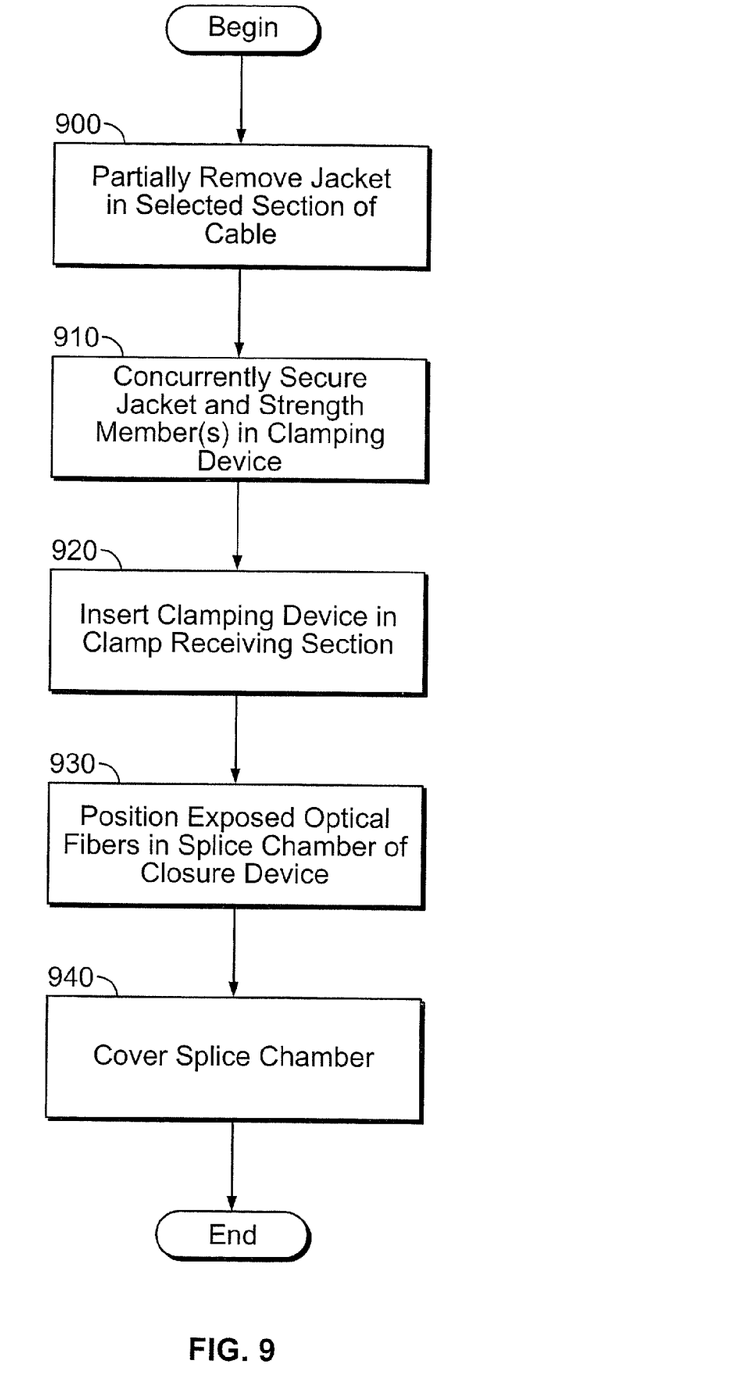
FIG. 9 is a flowchart illustrating operations for securing a fiber optic cable to a closure device according to some embodiments of the present invention.

A method for securing a fiber optic cable to a closure device will now be described with reference to the flowchart illustration of FIG. 9. Operations for some embodiments begin at Block 900 by partially removing the section of the jacket from the first end to a second, opposite lengthwise end to define a length of the section where the optical fibers will be accessed. The remaining portion of the jacket and the strength member are secured at a same clamp interface of a clamping device (Block 910). The same clamp interface is positioned at a location proximate an end of the removed section selected to limit a length of the strength member exposed between the same clamp surface and the end of the removed section. As described above, two different clamping devices may be used that are so positioned at respective opposite ends of the section and the clamping devices may be coupled to define a clamping device assembly. The clamping device/clamping device assembly is configured to be removably inserted into a clamp receiving section of a closure device.

The clamping device (assembly) with the remaining portion of the jacket and the strength member secured therein is inserted into the clamp receiving section of the closure device to secure the remaining portion of the jacket and the strength member secured in the clamping device to the closure device and fixedly limit their movement relative to the closure device (Block 920). The exposed optical fibers are positioned in a splice chamber of the closure device (Block 930). The splice chamber is covered with the optical fibers therein (Block 940).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A clamping device for a fiber optic cable, the cable having a lengthwise cable axis and including a plurality of optical fibers, a strength member and a jacket surrounding the optical fibers having a section thereof partially removed in a scalloped configuration that exposes an underlying section of the strength member while leaving a remaining portion of the jacket extending under the strength member, the clamping device comprising:
   a first clamp member having a receiving channel therein configured to receive the remaining portion of the jacket;
   a second clamp member having a first face configured to be received in the receiving channel of the first clamp member with the remaining portion of the jacket and the strength member positioned between the first clamp member and the second clamp member and a second face, opposite the first face, including a region configured to receive the plurality of optical fibers; and
   a coupling member that couples the first clamp member and the second clamp member and is configured to provide sufficient force between the first clamp member and the first face of the second clamp member to limit lengthwise movement of the strength member and remaining portion of the jacket therebetween, wherein the coupling member extends at least partially through the first clamp member and the second clamp member and is positioned to extend through the remaining portion of the jacket when the remaining portion of the jacket is positioned therebetween.

2. The clamping device of claim 1, wherein the region of the second clamp member configured to receive the plurality of optical fibers comprises a receiving channel.

3. The clamping device of claim 1, wherein at least one of the receiving channel of the first clamp member and the first face of the second clamp member includes ridges configured to deform the strength member when the strength member is secured therebetween to increase a force required to produce lengthwise movement of the strength member.

4. The clamping device of claim 1, wherein both the receiving channel of the first clamp member and the first face of the second clamp member include at least one ridge extending transversely substantially there across in alternating lengthwise locations configured to deform the strength member into a serpentine shape.

5. A closure device including the clamping device of claim 1 fixedly secured in an enclosure with the remaining portion of the jacket and the strength member secured in the clamping device to limit movement of the cable relative to the enclosure.

6. The clamping device of claim 1, wherein the first clamp member and the second clamp member comprise a first clamping device and further comprising a second clamping device configured to be coupled to the first clamping device, wherein the first clamping device and the second clamping device comprise a clamping device assembly, wherein the second clamping device has a first clamp member and a second clamp member configured to receive a second remaining portion of a jacket of a fiber optic cable and a second strength member therebetween and wherein the coupling member is configured to couple the first clamp member and second clamp member of the second clamping device to provide sufficient force between the first clamp member and the second clamp member of the second clamping device to limit lengthwise movement of the second strength member and second remaining portion of the jacket therebetween and to couple the first clamping device to the second clamping device to define the clamping device assembly.

7. The clamping device of claim 6, wherein the coupling member extends at least partially through the first clamp member and the second clamp member of the first clamping device and at least partially through the first clamp member and the second clamp member of the second clamping device and wherein the region of the second clamp member configured to receive the plurality of optical fibers comprises a curved face of the first clamp member of the first clamping device.

8. The clamping device of claim 7, wherein the first clamp member and the second clamp member of the first clamping device are configured to deform the strength member into a serpentine shape when the strength member is secured therebetween to increase a force required to produce lengthwise movement of the strength member therebetween and wherein the first clamp member and the second clamp member of the second clamping device are configured to deform the second strength member into a serpentine shape when the strength member is secured therebetween to increase a force required to produce lengthwise movement of the strength member therebetween.

9. The clamping device of claim 7, further comprising a first mating feature on the first clamping device and a corresponding second mating feature on the second clamping device, wherein the first and second mating features are configured to limit relative lengthwise movement between the first and second clamping devices in at least one lengthwise direction.

10. The clamping device of claim 9, wherein the first mating feature comprises a first transverse face on the first clamping device and the second mating feature comprises a second transverse face on the second clamping device and wherein the first transverse face abuts the second transverse face when the first clamping device is coupled to the second clamping device to rigidly limit relative lengthwise movement between the clamping devices in one direction.

11. The clamping device of claim 10, wherein the first clamping device is configured to slidably couple to the second clamping device and wherein the first mating feature further comprises a key member on the first clamping device and the second mating feature further comprises a receiving channel on the second clamping device that is configured to slidably receive the key member and wherein the key member may be advanced in the receiving channel in the one direction until the first transverse face abuts the second transverse face and the key member may be advanced in an opposite lengthwise direction to remove the key member from the receiving channel.

* * * * *